United States Patent
Wei et al.

(10) Patent No.: US 10,602,429 B2
(45) Date of Patent: Mar. 24, 2020

(54) ACCESS CONTROL IN NEW RADIO

(71) Applicant: FG Innovation Company Limited, Tuen Mun (CN)

(72) Inventors: Chia-Hung Wei, Hsinchu (TW); Chie-Ming Chou, Hsinchu (TW)

(73) Assignee: FG Innovation Company Limited, Tuen Mun, New Territories (HK)

( * ) Notice: Subject to any disclaimer, the term of this patent is extended or adjusted under 35 U.S.C. 154(b) by 0 days.

(21) Appl. No.: 16/444,165

(22) Filed: Jun. 18, 2019

(65) Prior Publication Data
US 2019/0335381 A1 Oct. 31, 2019

Related U.S. Application Data

(62) Division of application No. 15/942,505, filed on Mar. 31, 2018.

(60) Provisional application No. 62/480,512, filed on Apr. 2, 2017.

(51) Int. Cl.
| | |
|---|---|
| *H04W 48/04* | (2009.01) |
| *H04L 29/06* | (2006.01) |
| *H04W 48/02* | (2009.01) |
| *H04W 12/08* | (2009.01) |
| *H04W 48/14* | (2009.01) |
| *H04W 48/16* | (2009.01) |

(52) U.S. Cl.
CPC ........... *H04W 48/04* (2013.01); *H04L 63/101* (2013.01); *H04W 12/08* (2013.01); *H04W 48/02* (2013.01); *H04W 48/14* (2013.01); *H04W 48/16* (2013.01)

(58) Field of Classification Search
CPC ..... H04W 48/04; H04W 48/14; H04W 12/08; H04W 48/02; H04W 48/16; H04L 63/101
See application file for complete search history.

(56) References Cited

U.S. PATENT DOCUMENTS

| | | | |
|---|---|---|---|
| 2017/0251500 A1* | 8/2017 | Agiwal | H04W 4/06 |
| 2018/0220369 A1* | 8/2018 | Wu | H04W 52/0251 |
| 2019/0037635 A1* | 1/2019 | Guo | H04W 76/27 |

\* cited by examiner

*Primary Examiner* — Nizar N Sivji
(74) *Attorney, Agent, or Firm* — ScienBiziP, P.C.

(57) ABSTRACT

A method executed by a wireless device for network access of the wireless device to a network node is disclosed. The method includes initiating an access attempt to the network node; reading a first layer of access control information (ACI) from the network node to determine whether an access control indicator in the first layer for an access category is ON, wherein the access control indicator for the access category is associated with a characteristic/classification of the access attempt by the wireless device to the network node; in response to the access control indicator in the first layer for the access category being ON, reading a second layer of the ACI from the network node to determine whether the access attempt to the network node is allowed based on one or more specific parameters associated with the access category in the second layer of the ACI.

2 Claims, 7 Drawing Sheets

ACCESS CONTROL IN NEW RADIO

CROSS-REFERENCE TO RELATED APPLICATION(S)

This is a divisional of application Ser. No. 15/942,505, filed Mar. 31, 2018, which claims priority from provisional application Ser. No. 62/480,512, filed Apr. 2, 2017; the contents of all above-named applications are fully incorporated herein by reference for all purposes.

The present application claims the benefit of and priority to a provisional U.S. patent application Ser. No. 62/480,512 filed Apr. 2, 2017, entitled "ACCESS CONTROL IN NEW RADIO," (hereinafter referred to as "US62,068 application"). The disclosure of the US62,068 application is hereby incorporated fully by reference into the present application.

FIELD

The present disclosure generally relates to wireless communication methods and systems, and more particularly, to access control for the next generation wireless communication networks.

BACKGROUND

The 3$^{rd}$ Generation Partnership Project (3GPP) is currently developing protocols for the next generation wireless communication networks, also referred to as New Radio (NR). NR will enable new use cases for cellular access, and also increase the capacity for existing data applications. Even though the capacity of a system under NR may increase, there still can be situations where the base stations (e.g., next generation node Bs (gNBs)) and/or core networks (CNs) of the system may become overloaded. For example, a system overload may occur when a large number of user equipments (UEs) try to access the system in a synchronized manner (e.g., at the same time).

In a fourth generation (4G) wireless network, such as long term evolution (LTE), evolved LTE (eLTE), or LTE-Advanced (LTE-A), a radio access network (RAN) is responsible for activating access control when the RAN or the CN is overloaded. For example, a current access control scheme under a 4G wireless network may be performed in the RAN (e.g., RAN based), which primarily bars low priority UEs from attempting to perform random access procedures to transition from RRC_IDLE state to RRC_CONNECTED state. That is, the low priority UEs can be barred by the RAN from accessing the wireless network for a predetermined period of time when the RAN or CN is overloaded.

Based on the current 3GPP standard discussion, in addition to the current RRC_CONNECTED and RRC_IDLE states, a new RRC state, RRC_INACTIVE state, is introduced in the NR wireless networks. RRC_INACTIVE state under an NR wireless network is configured by a base station (e.g., gNB), and may be invisible to the CN. For example, when a base station (e.g., gNB) suspends a UE from RRC_CONNECTED to RRC_INACTIVE state, the CN may not receive a notification of such, and may still consider the UE as in RRC_CONNECTED state. While in RRC_INACTIVE state, the UE may transfer uplink (UL) data to the base state (e.g., gNB) without undergoing RRC state transition (e.g., without transitioning from RRC_INACTIVE state to RRC_CONNECTED state).

In the legacy 4G wireless networks, when the CN is overloaded and sends instructions to the RANs to block or bar traffic, the RANs may set up barring parameters to bar or block RRC_IDLE UEs from performing RRC state transition to RRC_CONNECTED state for data transmission. However, the access control schemes under the 4G wireless networks do not take into account of the newly introduced RRC_INACTIVE UEs that are capable of direct data uplink transmission to the base station without transitioning into RRC_CONNECTED state. As such, the legacy 4G wireless networks cannot effectively treat the RRC_INACTIVE UEs when the base station and/or the CN is overloaded.

For example, if RRC_INACTIVE UEs are present in a wireless network, and the CN does not know that some UEs under the RAN are suspended in the RRC_INACTIVE state (e.g., temporarily do not have data to upload), the CN may underestimate the network traffic condition in the RANs because of the presence of the RRC_INACTIVE UEs. That is, the CN may consider the RRC_INACTIVE UEs are in the RRC_CONNECTED state, and use their current data rates for the network traffic estimate. However, when these RRC_INACTIVE UEs start transferring data (e.g., using 2-step or 4-step RACH procedure) to their base stations, the actual data traffic would be greater than what the CN had originally estimated (e.g., the RAN continues to bring in additional traffic from the RRC_INACTIVE UEs to the CN), thereby exacerbating the traffic condition and overloading the base stations and/or the CN.

Thus, there is a need in the art for access control in new radio wireless networks to block traffic by dynamically assigning access control categorizations and sub-categorizations (e.g., barring factors) based on traffic conditions, to take into account of and manage each of the RRC states in NR, to conserve radio resources (e.g., stop unnecessary consumption of radio resource), and to preserve base station and/or CN's processing capacity for high priority traffic, data and/or applications from specific UEs.

SUMMARY

The present disclosure is directed to access control in new radio.

In a first aspect, a method for network access of a wireless device (e.g., a UE) to a network node (e.g., a base station) is disclosed, The method comprises initiating an access attempt to the network node; reading a first layer of access control information (ACI) from the network node to determine whether an access control indicator in the first layer for an access category is ON, wherein the access control indicator for the access category is associated with a characteristic/classification of the access attempt by the wireless device to the network node; in response to the access control indicator in the first layer for the access category being ON, reading a second layer of the ACI from the network node to determine whether the access attempt to the network node is allowed based on one or more specific parameters associated with the access category in the second layer of the ACI.

In an implementation of the first aspect, the method further comprises receiving an access attempt configuration (AAC) from the network node, the AAC including at least one value tag corresponding to the access category.

In another implementation of the first aspect, the method further comprises performing a value tag check to determine whether there is an update associated with the access category.

In another implementation of the first aspect, when the at least one value tag has not been updated, using the AAC to determine whether the access attempt to the network node is allowed.

In another implementation of the first aspect, the method further comprises, when the at least one value tag has been updated, using the second layer of the ACI to determine whether the access attempt to the network node is allowed based on the one or more specific parameters associated with the access category in the second layer of the ACI.

In another implementation of the first aspect, the AAC is configured by the network node, and includes information of at least one of the wireless device's access class and the ACI's default and current settings.

In another implementation of the first aspect, the wireless device's access class is dynamically assigned by the network node based on at least one of the wireless device's ID, quality of service (QoS) requirement and data size.

In another implementation of the first aspect, the method further comprises, in response to the access control indicator in the first layer for the access category being OFF, performing an access procedure to gain access to the network node without reading the second layer of the ACI.

In another implementation of the first aspect, the first layer of the ACI is categorized based on a radio resource control (RRC) state of the wireless device, and includes access control indications and common parameters.

In another implementation of the first aspect, the wireless device makes the access attempt in one of RRC_Inactive state, RRC_Connected state, and RRC_Idle state.

In another implementation of the first aspect, the first layer of ACI is broadcasted by the network node through minimum system information.

In another implementation of the first aspect, the method further comprises in response to the access control indicator in the first layer for the access category being ON, requesting the second layer of the ACI by the wireless device from the network node when the at least one value tag has been updated; sending, by the network node, the second layer of the ACI to the wireless device in response to the request through other system information.

In another implementation of the first aspect, the access category is associated with at least one of random access procedure, RAN-based notification area (RNA), RRC state transition, applications, network slice, RAN slice, quality of service (QoS) requirement and data size.

In another implementation of the first aspect, the access category is RNA update such that the RNA update is controlled by the ACI.

In a second aspect, a wireless device (e.g., a UE) for network access of the wireless device to a network node (e.g., a base station) is disclosed. The wireless device comprises: one or more processors; a non-transitory machine-readable memory storing a program, the program executable by at least one of the one or more processors, the program comprising sets of instructions for: initiating an access attempt to the network node; reading a first layer of access control information (ACI) from the network node to determine whether an access control indicator in the first layer for an access category is ON, wherein the access control indicator for the access category is associated with a characteristic/classification of the access attempt by the wireless device to the network node; in response to the access control indicator in the first layer for the access category being ON, reading a second layer of the ACI from the network node to determine whether the access attempt to the network node is allowed based on one or more specific parameters associated with the access category in the second layer of the ACI.

In an implementation of the second aspect, the program further comprises the sets of instructions for receiving an access attempt configuration (AAC) from the network node, the AAC including at least one value tag, the at least one value tag corresponding to the access category.

In another implementation of the second aspect, the program further comprises the sets of instructions for performing a value tag check to determine whether there is an update associated with the access category.

In another implementation of the second aspect, when the at least one value tag has not been updated, using the AAC to determine whether the access attempt to the network node is allowed.

In another implementation of the second aspect, the program further comprises the sets of instructions for, when the at least one value tag has been updated, using the second layer of the ACI to determine whether the access attempt to the network node is allowed based on the one or more specific parameters associated with the access category in the second layer of the ACI.

In another implementation of the second aspect, the AAC is configured by the network node, and includes information of at least one of the wireless device's access class and the ACI's default and current settings.

In another implementation of the second aspect, the wireless device's access class is dynamically assigned by the network node based on at least one of the wireless device's ID, quality of service (QoS) requirement and data size.

In another implementation of the second aspect, the program further comprises the sets of instructions for, in response to the access control indicator in the first layer for the access category being OFF, performing an access procedure to gain access to the network node without reading the second layer of the ACI.

In another implementation of the second aspect, the first layer of the ACI is categorized based on a radio resource control (RRC) state of the wireless device, and includes access control indications and common parameters.

In another implementation of the second aspect, the wireless device makes the access attempt in one of RRC_Inactive state, RRC_Connected state, and RRC_Idle state.

In another implementation of the second aspect, the program further comprises the sets of instructions for, in response to the access control indicator in the first layer for the access category being ON, requesting the second layer of the ACI by the wireless device from the network node when the at least one value tag has been updated.

In a third aspect, a network node (e.g., a base station) for network access of a wireless device (e.g., a UE) to the network node is disclosed. The network node comprises: one or more processors: a non-transitory machine-readable memory storing a program, the program executable by at least one of the one or more processors, the program comprising sets of instructions for: providing a first layer of access control information (ACI) to the wireless device, the first layer of the ACI having one or more access control indicators corresponding to one or more access categories; providing a second layer of the ACI to the wireless device upon request; wherein the wireless device requests for the second layer of the ACI when at least one of the one or more access control indicators in the first layer of the ACI associated with a characteristic/classification of an access attempt by the wireless device to the network node is ON.

In an implementation of the third aspect, the program further comprises the sets of instructions for providing an access attempt configuration (AAC) to the wireless device, the AAC including at least one value tag corresponding to the access category.

In another implementation of the third aspect, the network node dynamically assigns the wireless device's access class based on at least one of the wireless device's ID, quality of service (QoS) requirement and data size.

In another implementation of the third aspect, the access category is associated with at least one of random access procedure, RAN-based notification area (RNA), RRC state transition, applications, network slice, RAN slice, quality of service (QoS) requirement and data size.

DETAILED DESCRIPTION

Figure 1:
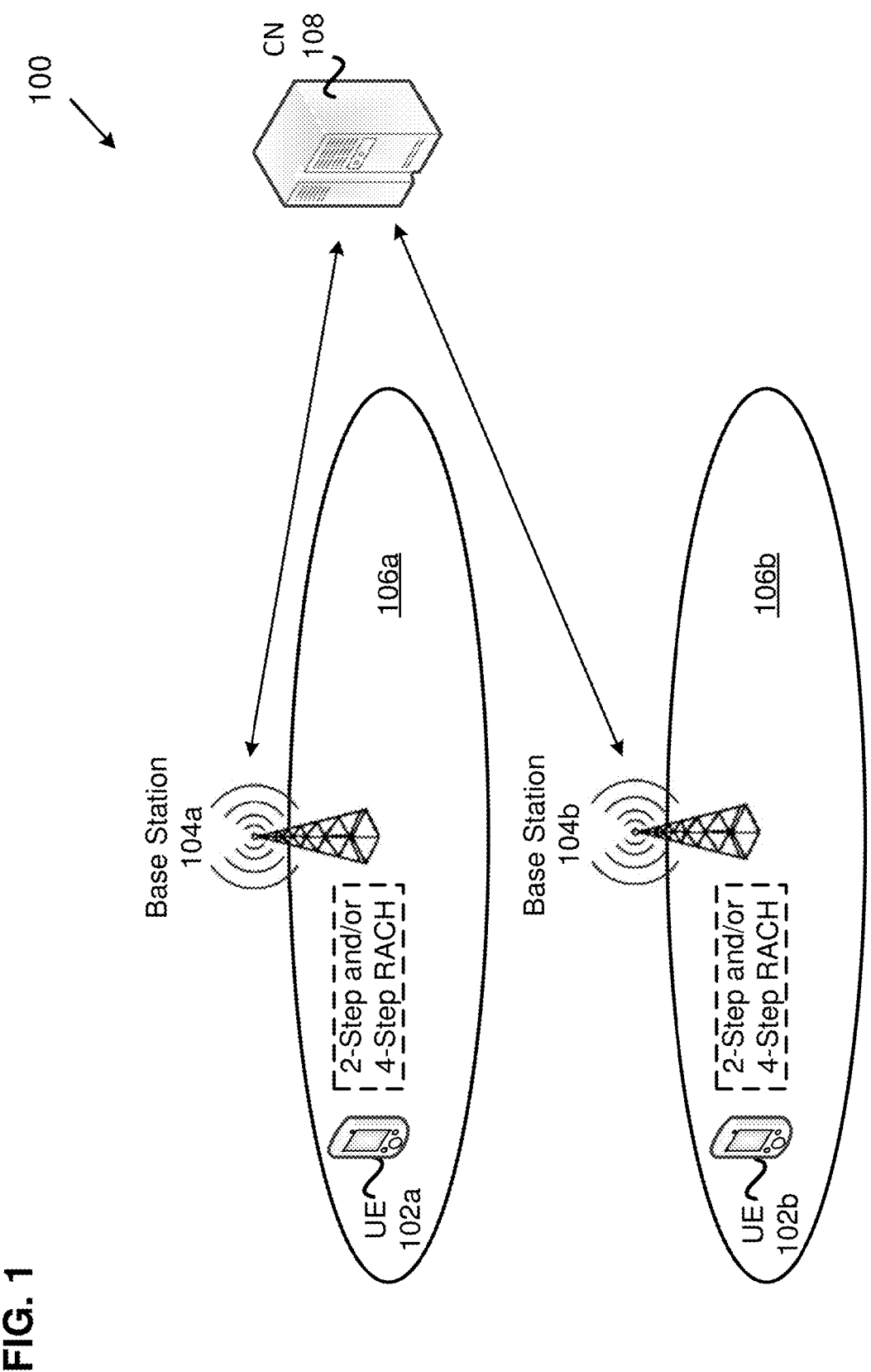
FIG. 1 is a schematic diagram of UEs performing data transmission using 2-step or 4-step random access procedures in a next generation wireless network, according to an exemplary implementation of the present application.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

In some implementations, the present application may include the language, such as, "at least one of [element A] and [element B]". This language may refer to one or more of the elements. For example, "at least one of A and B" may refer to "A", "B", or "A and B". In some implementations, the present application may include the language, such as, "[element A], [element B], and/or [element C]." This language may refer to either of the elements or any combination thereof. In other words, "A, B, and/or C" may refer to "A", "B", "C", "A and B", "A and C", "B and C", or "A, B, and C".

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one network node (e.g., base station), at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the network node (e.g., base station).

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A network node may include a base station. A base station may include, but is not limited to, a node B (NB) as in the UMTS, an evolved node B (eNB) as in the LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

FIG. 1 shows a schematic diagram of UEs performing data transmission using 2-step and 4-step random access procedures in a next generation (e.g., 5G NR) wireless network, according to an exemplary implementation of the present application. As shown in FIG. 1, wireless communication system 100 includes UE 102a, UE 102b, base station 104a (e.g., a gNB) having coverage area 106a, base station 104b (e.g., a gNB) having coverage area 106b, where base stations 104a and 104b can access core network (CN) 108, such as a next generation core network (e.g., 5G Core Network (5GC)). In the present implementation, CN 108 may signal base station 104a and base station 104b through 5GC notifications. In the one implementation, base station 104a is within a first RAN-based notification area, RNA1, while base station 104b is within a second RAN-based notification area, RNA2, that is different from RNA1. In the present exemplary implementation, RNA1 and RNA2 are neighboring RAN-based notification areas. In another implementation, base stations 104a and 104b may be two neighboring cells in a single RAN-based notification area. In FIG. 1, UEs 102a and 102b can each use a 2-step or a 4-step random access procedure to establish connection or re-synchronization with their respective base stations 104a and 104b. Also, UEs 102a and 102b are capable of transmitting uplink (UL) data to their respective base stations 104a and 104b using the 2-step or 4-step random access procedure.

Figure 2:
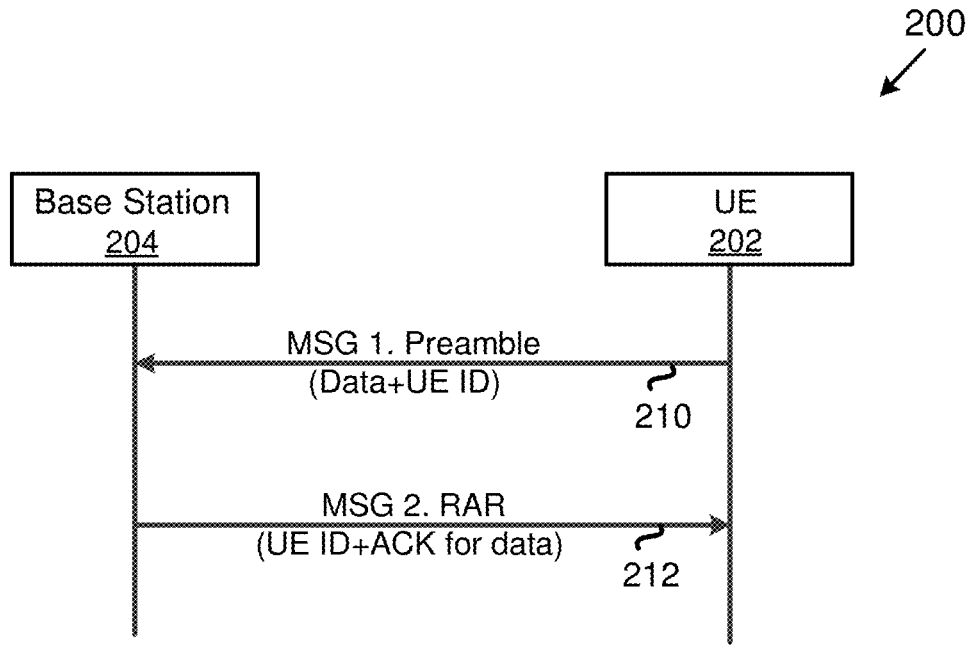
FIG. 2 is a diagram illustrating data transmission using a 2-step random access procedure, according to an exemplary implementation of the present application.

FIG. 2 illustrates a diagram of data transmission using a 2-step random access procedure, according to an exemplary implementation of the present application. Diagram 200 includes UE 202 and base station 204 (e.g., a gNB) where UE 202 may transmit UL data to base station 204 using a 2-step random access procedure. In the present implementation, UE 202 and base station 204 may substantially correspond to UE 102a (or UE 102b) and base station 104a (or base station 104b), respectively, in FIG. 1.

As illustrated in FIG. 2, action 210 includes UE 202 transmitting a random access channel (RACH) preamble (e.g., MSG 1) to base station 204. Base station 204 configures random access channel (RACH) resources which are used to let UE 202 transmit the RACH preamble, uplink (UL) data and the UE ID of UE 202. UE 202 may randomly select a RACH preamble resource to be actually used from the RACH preamble resources (e.g., prescribed by combinations of time resources, frequency resources and sequence resources). Then, UE 202 may transmit the RACH preamble using the selected RACH preamble resource. The UL data along with the UE ID of UE 202 may also be multiplexed with the RACH preamble in the MSG1.

As illustrated in FIG. 2, action 212 includes base station 204 transmitting a random access response (RAR) (e.g., MSG 2) to UE 202, when base station 204 detects the RACH preamble, the UL data along with the UE ID of UE 202. For UL data transmission, base station 204 may provide an acknowledge (ACK)/non-acknowledgement (NACK) message in MSG 2 to indicate whether base station 204 has received the UL data in MSG 1 successfully.

Figure 3:
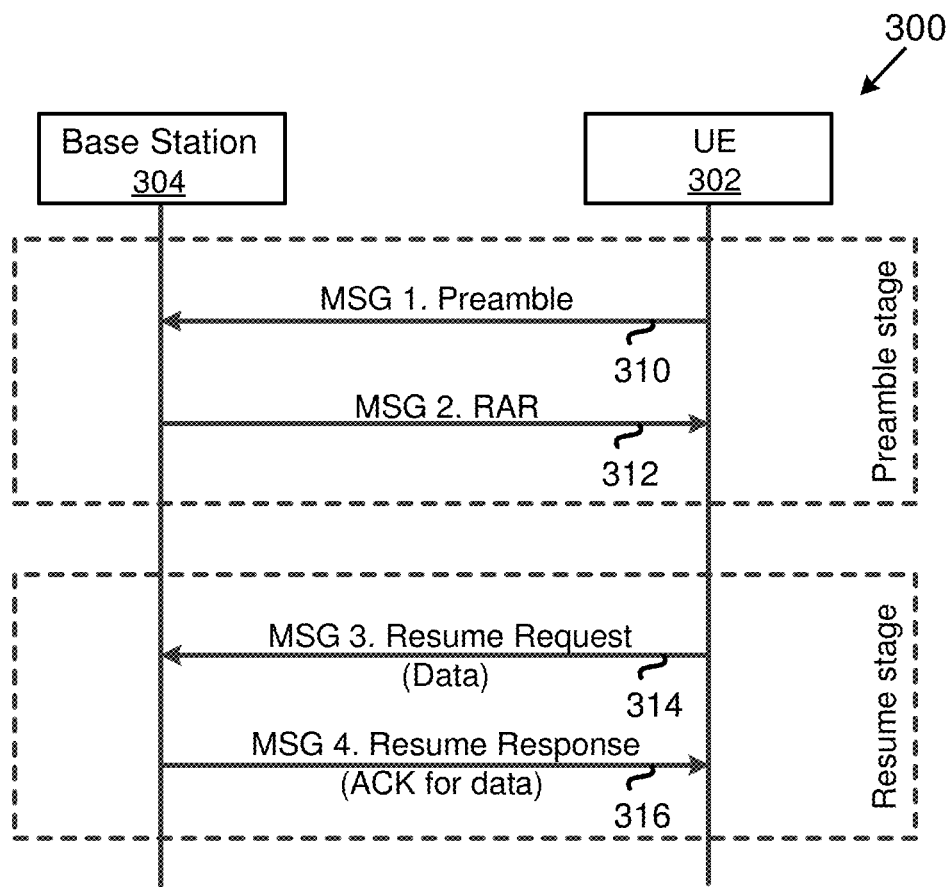
FIG. 3 is a diagram illustrating data transmission using a 4-step random access procedure, according to an exemplary implementation of the present application.

FIG. 3 illustrates a diagram of data transmission using a 4-step random access procedure, according to an exemplary implementation of the present application. Diagram 300 includes UE 302 and base station 304 (e.g., a gNB), where UE 302 may transmit UL data to base station 304 using a 4-step random access procedure. In the present implementation, UE 302 and base station 304 may substantially correspond to UE 102a (or UE 102b) and base station 104a (or base station 104b), respectively, in FIG. 1.

As illustrated in FIG. 3, action 310 includes UE 302 transmitting a random access channel (RACH) preamble (e.g., MSG 1) to base station 304. In the present implementation, UE 302 may randomly select a RACH preamble resource to be actually used from a group of RACH preamble resource candidates (prescribed by combinations of time resources, frequency resources and sequence resources). Then, UE 302 may transmit the RACH preamble using the selected RACH preamble resource.

Action 312 includes base station 304 transmitting a random access response (RAR) (e.g., MSG 2) to UE 302, when base station 304 detects the RACH preamble. The RAR is transmitted over the entire cell covered by base station 304, since base station 304 may not have been able to identified UE 302 that transmitted the RACH preamble. For example, a physical downlink shared channel (PDSCH) resource in which the RAR is mapped may be indicated by base station 304 to UE 302 via a physical downlink control channel (PDCCH). Also, the RAR may contain information relating to a resource to be used by UE 302 in uplink or information relating to uplink transmission timing for UE 302.

Action 314 includes UE 302 transmitting an RRC connection request or a scheduling request (e.g., MSG 3) using the uplink resource specified by base station 304 via the RAR in action 312. In the present implementation, UE 302 transmits a Resume Request message to base station 304, where the Resume Request message may not be requesting for transitioning to RRC_CONNECTED state. Instead, the Resume Request message in MSG 3 is used for transmitting uplink (UL) data.

Action 316 includes base station 304 transmitting an RRC connection response or a scheduling response (e.g., MSG 4) to UE 302, when base station 304 detects the RRC connection request or the scheduling request. In the present implementation, base station 304 transmits a Resume Response message to UE 302, where the Resume Response message may not be for resuming, but contains corresponding acknowledgement of the UL data sent in MSG 3 in action 314.

Thus, FIGS. 2 and 3 show that according implementations of the present application, UEs can transmit UL data to their respective base stations (e.g., gNBs) in a 5G NR wireless network using either a 2-step or 4-step random access procedure. For example, UE 202 (or UE 302) may be in RRC_INACTIVE state, and still able to transmit UL data to base station 204 (or 304) without transitioning to RRC_CONNECTED state.

Figure 4:
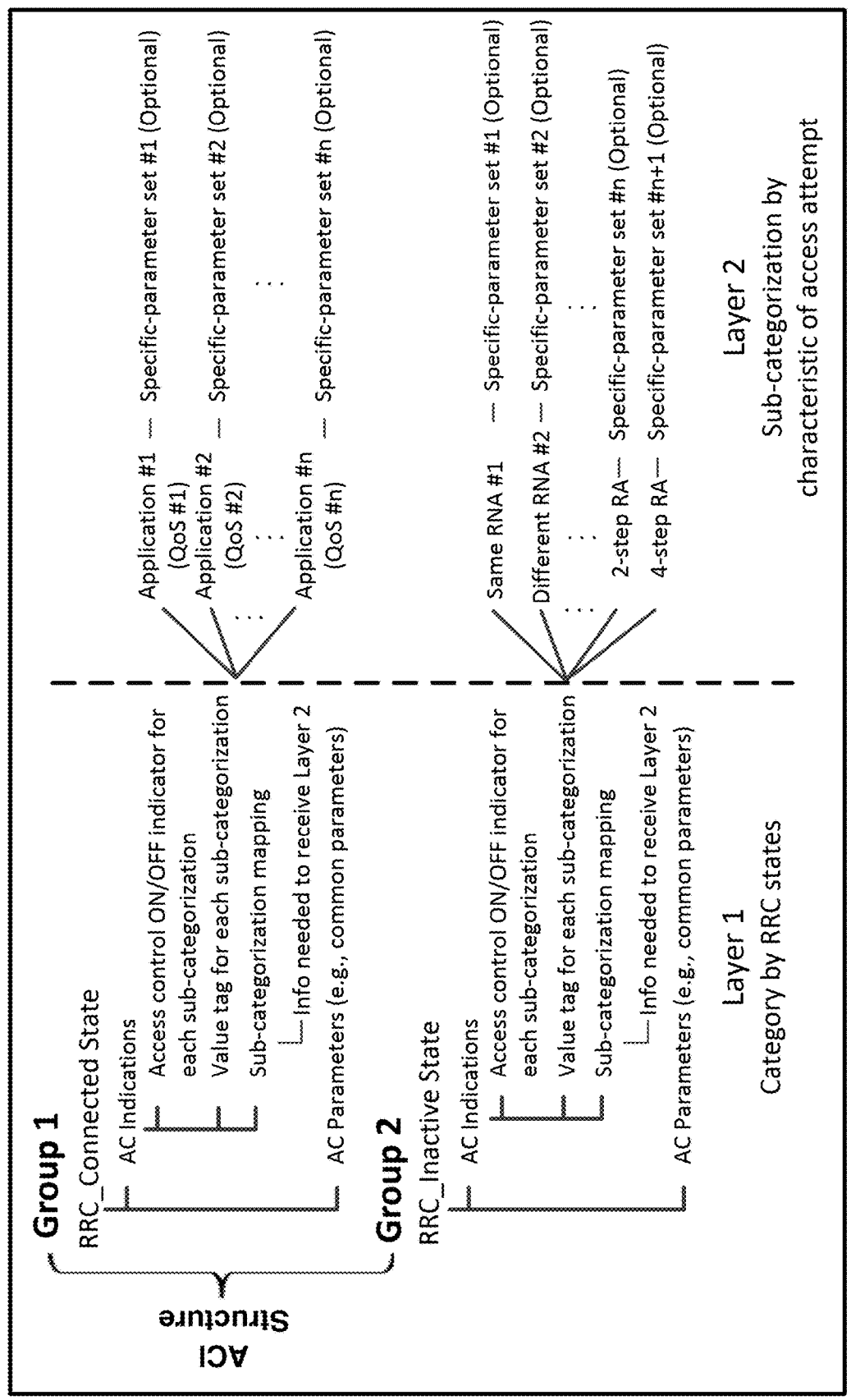
FIG. 4 is a diagram illustrating an access control information (ACI) structure, according to an exemplary implementation of the present application.

FIG. 4 is a diagram illustrating an access control information (ACI) structure, according to an exemplary implementation of the present application. ACI structure 400 may include a plurality of layers. In the present implementation, ACI structure 400 includes a first layer (e.g., Layer 1) and a second layer (e.g., Layer 2). Layer 1 of ACI structure 400 includes access control indications and common parameters for each of a plurality of groups (e.g., Group 1 and Group 2). Layer 2 of ACI structure 400 includes sub-categorizations of the access control related information for each group (e.g., based on RRC state) in Layer 1. For example, the sub-categorizations in Layer 2 may be based on the characteristics of the access attempts by the UEs. Although FIG. 4 illustrates that ACI structure 400 includes two layers, it should be understood that ACI structure 400 may include more than two layers. The multi-layer ACI structure 400 allows the next generation (e.g., 5G NR) wireless network to achieve smaller granularity on controlling access attempt.

In the present implementation, Layer 1 of ACI structure 400 is divided into a plurality of groups based on RRC state. For example, in Layer 1, Group 1 is categorized by RRC_CONNECTED state, while Group 2 is categorized by RRC_INACTIVE state. It should be noted that another group (e.g., Group 3 not explicitly shown in FIG. 4) may be categorized by RRC_IDLE state in ACI structure 400. As illustrated in FIG. 4, each group contains one or more access control indication(s) and access control parameter(s). For example, in Group 1, the access control indications for RRC_CONNECTED state may include, but is not limited to, access control ON/OFF indicators for the corresponding sub-categorizations in Layer 2, value tags for the corresponding sub-categorizations in Layer 2, and sub-categorization mapping of Layer 2.

The access control ON/OFF indicators in Layer 1 of ACI structure 400 may provide indication to the UEs on whether a current access control is ON or OFF for a corresponding sub-categorization in Layer 2. In one implementation, the access control ON/OFF indicators may be in the form of a bit map.

The value tags in Layer 1 of ACI structure 400 may provide indication to the UEs on whether the access control parameters for each group and/or sub-categorization have been updated. In one implementation, before receiving ACI structure 400, the UE may receive a value tag through a message from the base station (e.g., gNB) in a message containing access control configuration (AAC). If later, when reading the value tag in Layer 1, the UE determines the value tag is the same as the one in the ACC, then the UE already has the information. Thus, there is no need for the base station to broadcast or transmit (or for the UE to read) the information again. In another implementation, the UE may not receive a value tag in the message containing the AAC from the base station. That is, the UE may not receive the current ACI setting in the message containing the AAC. In such case, the UE still performs value tag check upon receiving Layer 1 of the ACI structure, but compares the value tag in Layer 1 of the ACI structure with the value tag that the UE had previously read and stored. In both implementations described above, the UE performs value tag check before requesting Layer 2 of the ACI structure. Reading value tags before reading the specific parameters for the corresponding sub-categorization in Layer 2 can avoid unnecessary ACI reading overhead, when the value tag has not been changed or updated. The access control indications and parameters within each group, layer and sub-categorization of ACI structure 400 can be updated independently.

The sub-categorization mapping in Layer 1 of ACI structure 400 may provide information (e.g., a tree-type mapping) to the UEs to let the UEs know the details (e.g., default and/or current settings) of ACI structure 400. As such, the UEs can find and read the corresponding sub-categorizations without any prior knowledge of the ACI structure 400. For example, all of the details in Layer 2 of ACI structure 400 may be included in the sub-categorization mapping.

In each group, the access control parameters for an RRC state may include, but is not limited to, allowed access time duration, data retransmission times, time/frequency resources for data transmission, barring factor and backoff timer. In one implementation, the access control parameters may be common parameters that all of the UEs need to read from the base station. The common parameters may include parameters that are needed by all UEs within each RRC state and/or the parameter's associated settings are the same for each sub-categorization.

In each group the indicators for an RRC state may include, but is not limited to, access control ON/OFF indicators for the corresponding sub-categorizations (e.g., access classes) in Layer 2, value tags for the corresponding sub-categorizations (e.g., access classes) in Layer 2, and sub-categorization mapping of Layer 2.

As shown in FIG. 4, Layer 2 includes sub-categorizations of the access control related information based on the one or more characteristics of the access attempts of the UEs. The characteristics of the access attempt may include, but are not limited to, 2-step or 4-step random access channel perspective, same RNA (e.g., home RAN) or different RNA, RRC state transition, applications, network slice, RAN slice, QoS requirement and mobility. For example, when a next generation (e.g., 5G NR) wireless network is congested or having limited resource, the UEs with high QoS/application requirements may be given precedence over other UEs in radio resource assignment. It should be noted, ACI structure 400 is forward compatible. That is, ACI structure 400 may add or hook new messages and/or parameters in its layered structure to be compatible with future access control structures, schemes and methods.

As shown in FIG. 4, the characteristic of the access attempt for Group 1 (e.g., RRC_CONNECTED state) may be based on core network slice, RAN slice, and the QoS requirement of the UEs for Layer 2. For example, there is a specific parameter set (e.g., specific parameter sets 1, 2, . . . n) for each QoS requirement (e.g., QoSs 1, 2, . . . n). The characteristics of the access attempt for Group 2 (e.g., RRC_INACTIVE state) may be based on core network slice, RAN slice, and 2-step or 4-step random access procedures for Layer 2. For example, there is a specific parameter set (e.g., specific parameter sets 1, 2, . . . n) for each of the characteristics. It should be noted that the next generation wireless network may assign and configure independent sets of access control parameters for different application(s)/QoS(s) via different sub-categorizations.

As shown in FIG. 4, ACI structure 400 include multiple groups based on RRC state, where each group includes at least two layers. Within each group of ACI structure 400, Layer 1 includes common parameters, while Layer 2 includes specific-parameters for each sub-categorization. In one implementation, the access control parameters may be common parameters that all of the UEs need to read from the base station. For example, the common parameters may include parameters that are needed by all UEs within each RRC state and the parameter's associated settings are the same for each sub-categorization. The specific parameters are the parameters which associated settings are different between each sub-categorization and can be: allowed time duration, data retransmission times, time/frequency resources for data transmission, two or four steps random access channels perspective, barring factor, backoff timer. It is noted that the specific parameters also can be different for each sub-categorization. ACI structure 400, as a spanning tree structure shown in the FIG. 4, is merely an example of the present application, as all of the access control parameters can be combined, exchanged, replaced and be used in each layers.

ACI structure 400 may contain a lot of information, but not all of the information is needed by every UE trying to access the NR wireless network. According to implementations of the present application, not all UEs need to read the entire ACI structure. That is, the UEs need only the parts of the ACI structure that pertain to them. Each group, layer and/or sub-categorization of the ACI structure can be transmitted or broadcasted separately by using different messages and/or through different network entities (e.g., base stations and/or transmit receive points (TRPs)). For example, a central node receives the system request, it can instruct a TRP under the central node to transmit the sub-categorization.

Layer 1 of ACI structure 400 may further include indicators to indicate the necessary/required information to the UEs for receiving associated sub-categorization in Layer 2 of ACI structure 400. The necessary/required information indicators may include, but is not limited to, sub-categorization mapping, time/frequency resource used for transmission, the network entity and/or system information by which each sub-categorization is transmitted or broadcasted. Hence, a UE can read only the part of the ACI it needs accordingly.

Layer 1 of ACI structure 400 can contain access control ON/OFF indicators for indicating whether an access control scheme is currently ON or OFF for each sub-categorization (can be a bitmap). Layer 1 of ACI structure 400 can also contain value tags for indicating the updated version of access control parameters for each group and/or each sub-categorization. The indicator(s) and parameter(s) within each group, layer and sub-categorization of ACI can be updated independently. The sub-categorizations are determined based on a need basis (e.g., based on current traffic condition).

Based on the resource allocation and the supported service a base station or TRP provides, the base station or TRP can periodically broadcast Layer 1 of ACI structure 400, and transmit or broadcast Layer 2 of ACI structure 400 when requested by the UEs (e.g., on-demand basis). In one implementation, Layer 1 of ACI structure 400 is contained or carried in minimal system information (SI), periodically broadcasted by the base station or TRP. Also, the base station or TRP may transmit dedicated RRC signaling and/or broadcast Layer 2 of ACI structure 400 to individual UEs when such requests are received from the UEs, where Layer 2 of ACI structure 400 is contained or carried in other SI. It should be noted that ACI structure 400 may become invalid when a UE moves out of the base station's coverage area (e.g., moving out of an NR network into an LTE network), then the UE may adopt the corresponding access control in accordance with the LTE specification.

According to an implementation of the present application, a base station (e.g., gNB) may perform beamforming, and use different beams to broadcast different ACI structures subject to different access control schemes. A UE may need to perform ACI acquisition for every beam from the base station. In another implementation, all beams formed and broadcasted by the base station may have a uniform ACI structure. A UE may skip ACI acquisition when the UE changes from one beam to another beam. For example, when a UE performs beam recovery, it can apply the same parameters acquired from the previous beam, when switching to another beam under the same cell.

According to an implementation of the present application, a base station may use medium access control (MAC) control element (CE) or RRC signaling to request connected UEs to perform ACI acquisition, to change any of the access control ON/OFF indicators in Layer 1 or modify the specific parameters in Layer 2. In another implementation, for RRC_INACTIVE UEs, a base station can use paging message to trigger which kind of behavior it desires.

Figure 5:
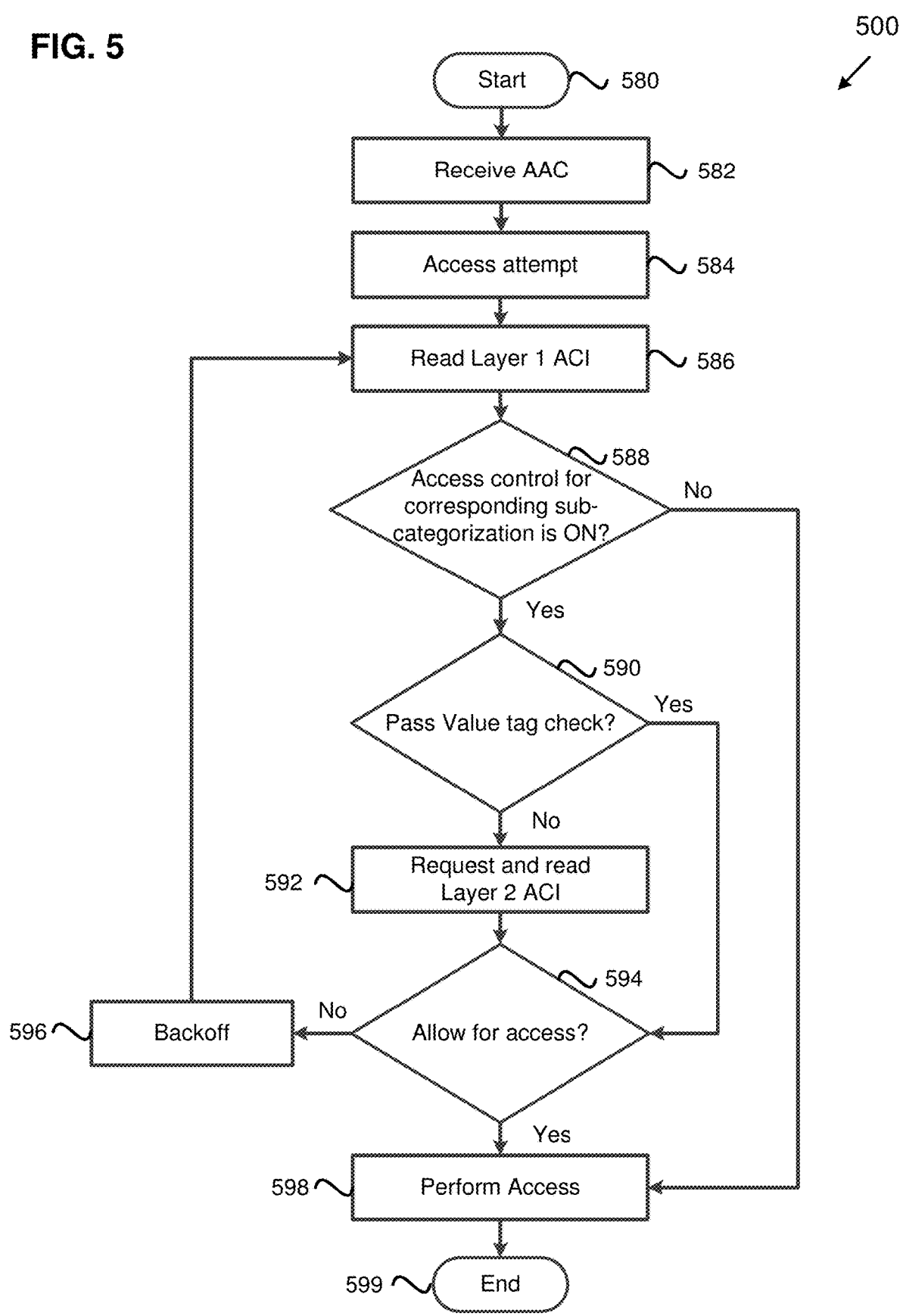
FIG. 5 is a flowchart illustrating a method for access control, according to an exemplary implementation of the present application.

FIG. 5 is a flowchart illustrating a method for access control, according to an exemplary implementation of the present application. Flowchart 500 starts with action 580 and ends with action 599. In action 582, a UE receives access attempt configuration. Depending on the RRC state the UE is in, the UE may receive the AAC in different RRC messages from a base station on which the UE camps. The AAC may be UE-specific, meaning that the AAC is configured by the base station and may contain the UE's access class(es) (e.g., sub-categorization), which RACH (e.g., 2-step or 4-step or both) is allowed for the UE for each corresponding access attempt purpose, and etc. In one implementation of the present application, the AAC may be determined by, for example, the application the UE performs and its associated QoS requirement. In addition, the current corresponding specific parameters in Layer 2 of an ACI structure (e.g., Layer 2 of ACI structure 400 in FIG. 4) for the UE can also be contained in the RRC message or ACC for each access attempt purpose.

In action 584, the UE may generate an access attempt. Depending on the RRC state the UE is in, the UE may generate an access attempt for various access attempt purposes, such as data transmission via random access, RAN notification area (RNA) update, and RRC resume procedure. In action 586, after the UE generates an access attempt, the UE may read Layer 1 of the ACI structure (e.g., Layer 1 of ACI structure 400 in FIG. 4) broadcasted by the base station. For example, the UE may check whether the access control ON/OFF indicators for its corresponding sub-categorizations are ON or OFF by reading the access control ON/OFF indicators within Layer 1 of the ACI structure. The Layer 1 of the ACI structure may be included in the minimal SI or periodically broadcasted SI from the base station.

In action 588, the UE may check whether the access control ON/OFF indicator(s) for the corresponding sub-categorization(s) is ON or OFF. If the access control ON/OFF indicator for a corresponding sub-categorization is OFF, the UE may stop reading or ignore the associated control parameters within Layer 2 of the ACI structure. If the access control ON/OFF indicator for the corresponding sub-categorization is OFF, the UE may also stop reading or ignore the common parameters in Layer 1 of the ACI structure. The UE may proceed to action 598 to perform access procedure. On the other hand, if the access control ON/OFF indicator for a corresponding sub-categorization is ON, the UE needs to further read the associated control parameters within Layer 2 of the ACI structure (which obtained via other SI or dedicated signaling or on-demand broadcast SI or on-demand other SI) to obtain all access control parameters it needs to apply.

Before the UE obtaining Layer 2 of the ACI structure, the UE may check the value tag of corresponding sub-categorization in Layer 2 in action 590. In one implementation, the UE may read the value tag in Layer 1, and compare it with a value tag contained in the AAC obtained in action 582. If the value tag in Layer 1 has not been changed or updated (e.g., the value tag of the corresponding sub-categorization is the same as the value tag contained in the AAC obtained in action 582), then the UE may use the specific parameters contained in the UE specific AAC received in action 582, instead of reading the specific parameters of the corresponding sub-categorization in Layer 2 again. In another implementation, the UE may not receive the current ACI setting in the message containing the UE specific AAC from the base station. In such case, the UE still performs value tag check upon receiving Layer 1 of the ACI structure, but compares the value tag in Layer 1 of the ACI structure with the value tag that the UE had previously read and stored. In both implementations described above, the UE performs value tag check before requesting Layer 2 of the ACI structure. Performing the value tag check in action 590 may avoid unnecessary ACI reading overhead. If the value tag has been updated, then the UE may proceed to action 592 to request and read updated specific parameters in Layer 2 of the ACI structure (which may be obtained through other SI or dedicated signaling or on-demand broadcast SI or on-demand other SI).

As shown in action 594, if the UE reads and passes all the specific parameters based on the corresponding sub-categorizations, the UE may be allowed for access attempt. It is noted that, the UE should also access the network by following corresponding specific parameters received in Layer 2 of ACI structure. Otherwise, the UE may be assigned with a backoff time in action 596, before reading read Layer 1 of the ACI structure again in action 586.

In action 598, once the UE is allowed to access the network, the UE may perform access procedure with the base station. During the access procedure (e.g., data transmission via random access, RAN notification area (RNA) update) performed by the UE, the base station may also perform the UE's AAC configuration update. Within the access stage, the base station can provide a new/updated UE specific AAC for performing RAN notification area update, and also can provide a UE-specific AAC for performing data transmission via random access to the UE.

Figure 6A:
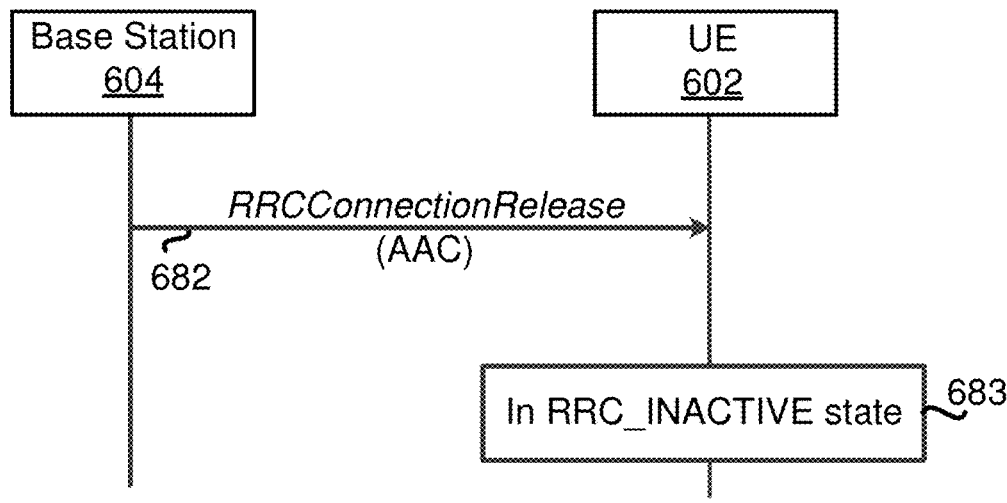
FIG. 6A is a diagram illustrating an access attempt configuration (AAC) transmission for an RRC_INACTIVE UE, according to an exemplary implementation of the present application.
Figure 6B:
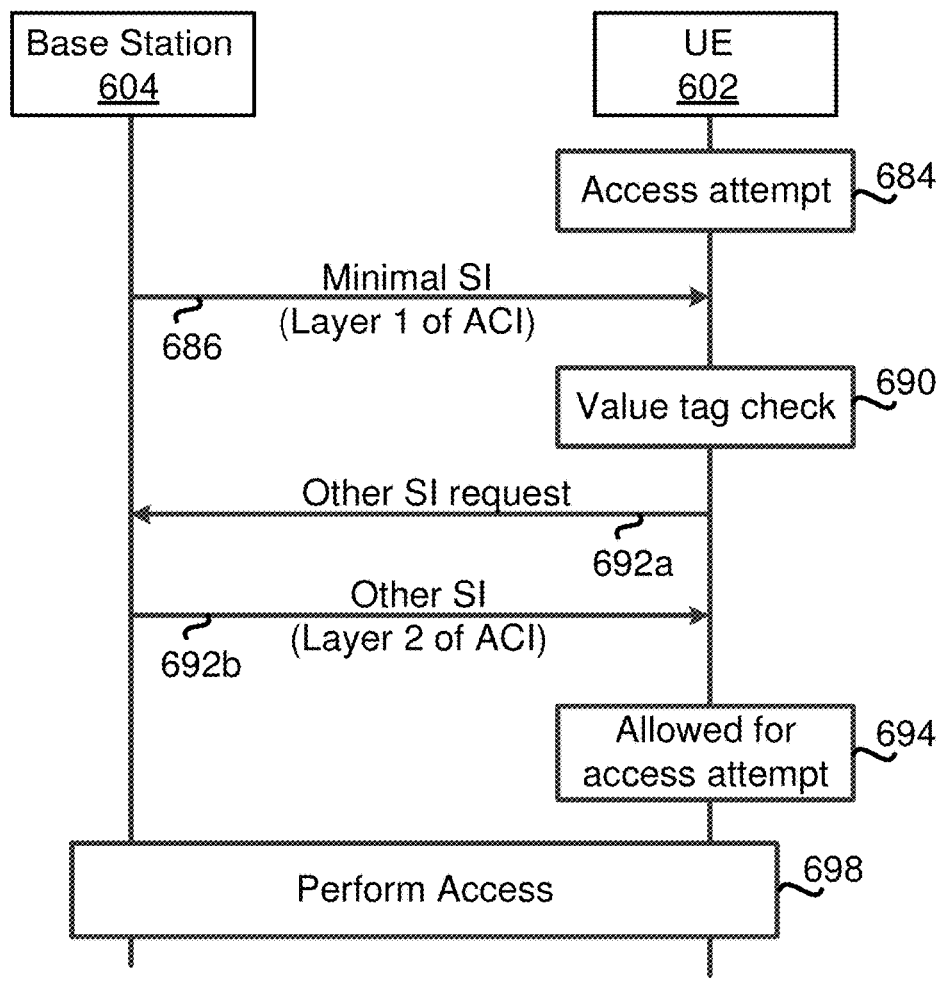
FIG. 6B is a diagram illustrating an access control information (ACI) transmission for an RRC_INACTIVE UE, according to an exemplary implementation of the present application.

FIG. 6A is a diagram illustrating an access attempt configuration (AAC) transmission for an RRC_INACTIVE UE, according to an exemplary implementation of the present application. FIG. 6B is a diagram illustrating an access control information (ACI) transmission for an RRC_INACTIVE UE, according to an exemplary implementation of the present application. FIGS. 6A and 6B illustrate an access control is performed by a base station (e.g., gNB) to control access of an RRC_INACTIVE UE.

As shown in FIG. 6A, during an RRC Suspend procedure, base station 604 transmits an RRCConnectionRelease message to UE 602 in action 682. In the present implementation, the RRCConnectionRelease message contains a UE specific AAC, where the UE specific AAC is configured by base station 604 and contains UE 602's access class(es) (e.g., sub-categorization) and which RACH (e.g., 2-step or 4-step or both) is allowed for UE 602 for each corresponding access attempt purpose. In one implementation of the present application, the AAC configurations are determined by the application UE 602 performs and its associated QoS requirement. In addition, a current value tag and/or its corresponding specific parameters in Layer 2 of an ACI structure (e.g., Layer 2 of ACI structure 400 in FIG. 4) for UE 602 can also be contained in the RRCConnectionRelease message for each access attempt purpose/category. After receiving the RRCConnectionRelease message, UE 602 transitions into RRC_INACTIVE state in action 683.

As shown in FIG. 6B, in action 684, UE 602 in RRC_INACTIVE state may generate an access attempt. In RRC_INACTIVE state, UE 602 may generate an access attempt for at least one of the following access attempt purposes: data transmission via random access, RAN notification area (RNA) update, and RRC resume procedure.

In action 686, base station 604 may provide Layer 1 of an ACI structure (Layer 1 of ACI structure 400 in FIG. 4) to RRC_INACTIVE UE 602. RRC_INACTIVE UE 602 may check whether the access control ON/OFF indicators for its corresponding sub-categorizations are ON or OFF by reading the access control ON/OFF indicators within Layer 1 of the ACI structure transmitted from base station 604. In the present implementation, UE 602 may obtain Layer 1 of the ACI structure by the minimal SI or periodically broadcasted SI. If the access control ON/OFF indicator for a corresponding sub-categorization is OFF, UE 602 may stop reading or ignore the associated control parameters within Layer 2 of the ACI structure. If the access control ON/OFF indicator for the corresponding sub-categorization is OFF, UE 602 may also stop reading or ignore the common parameters in Layer 1 of the ACI structure. UE 602 may proceed to action 698 to perform access procedure. On the other hand, if the access control ON/OFF indicator for a corresponding sub-categorization is ON, UE 602 needs to further read the associated control parameters within Layer 2 of the ACI structure (which obtained via other SI or dedicated signaling or on-demand broadcast SI or on-demand other SI) to obtain all access control parameters it needs to apply.

Before UE 602 making a request to base station 604 for Layer 2 of the ACI structure, UE 602 may check the value tag of corresponding sub-categorization in Layer 2 in action 690. If the value tag has not been changed or updated (e.g., the value tag of the corresponding sub-categorization is the same as the value tag contained in the AAC obtained in action 682), UE 602 may use the UE specific AAC obtained in action 682 which may contain UE 602's access class(es) (e.g., sub-categorization) and which RACH (e.g., 2-step or 4-step or both) is allowed for UE 602 for each corresponding access attempt purpose. That is, UE 602 may use the specific parameters contained in the UE specific AAC received in action 682, instead of reading the specific parameters of the corresponding sub-categorization in Layer 2 again. Performing the value tag check in action 690 may avoid unnecessary ACI reading overhead. If the value tag has been updated, then UE 602 may need to request and read updated specific parameters in Layer 2 of the ACI structure (which may be obtained through other SI or dedicated signaling or on-demand broadcast SI), as shown in action 692a (e.g., UE 602 requesting Layer 2 of the ACI structure through other SI request) and action 692b (e.g., base station 604 providing Layer 2 of the ACI structure through other SI upon the request from UE 602, and UE 602 reading Layer 2 of the ACI).

In action 694, if UE 602 passes all the specific parameters based on the corresponding sub-categorizations, UE 602 may be allowed to access the NR network through base station 604. Otherwise, UE 602 may be assigned with a backoff time before reading read Layer 1 of the ACI structure again. In action 698, once UE 602 is allowed to access the NR network, UE 602 may perform access procedure with base station 604 by following the specific parameters in Layer 2 of the ACI structure. During the access procedure (e.g., data transmission via random access, RAN notification area (RNA) update) performed by UE 602, base station 604 may also perform the UE's AAC configuration update. Within the access stage, base station 604 can provide a new/updated UE specific AAC for performing RAN notification area update, and also can provide a UE-specific AAC for performing data transmission via random access to UE 602.

Figure 7A:
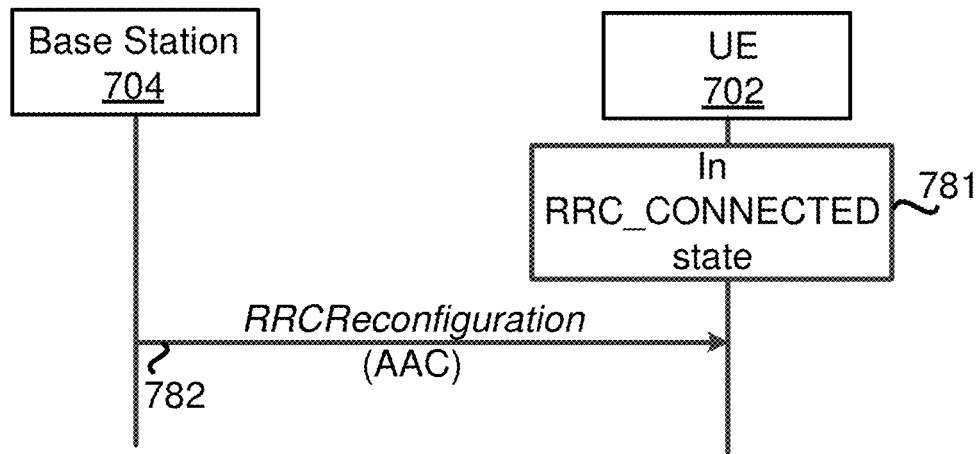
FIG. 7A is a diagram illustrating an access attempt configuration (AAC) transmission for an RRC_CONNECTED UE, according to an exemplary implementation of the present application.
Figure 7B:
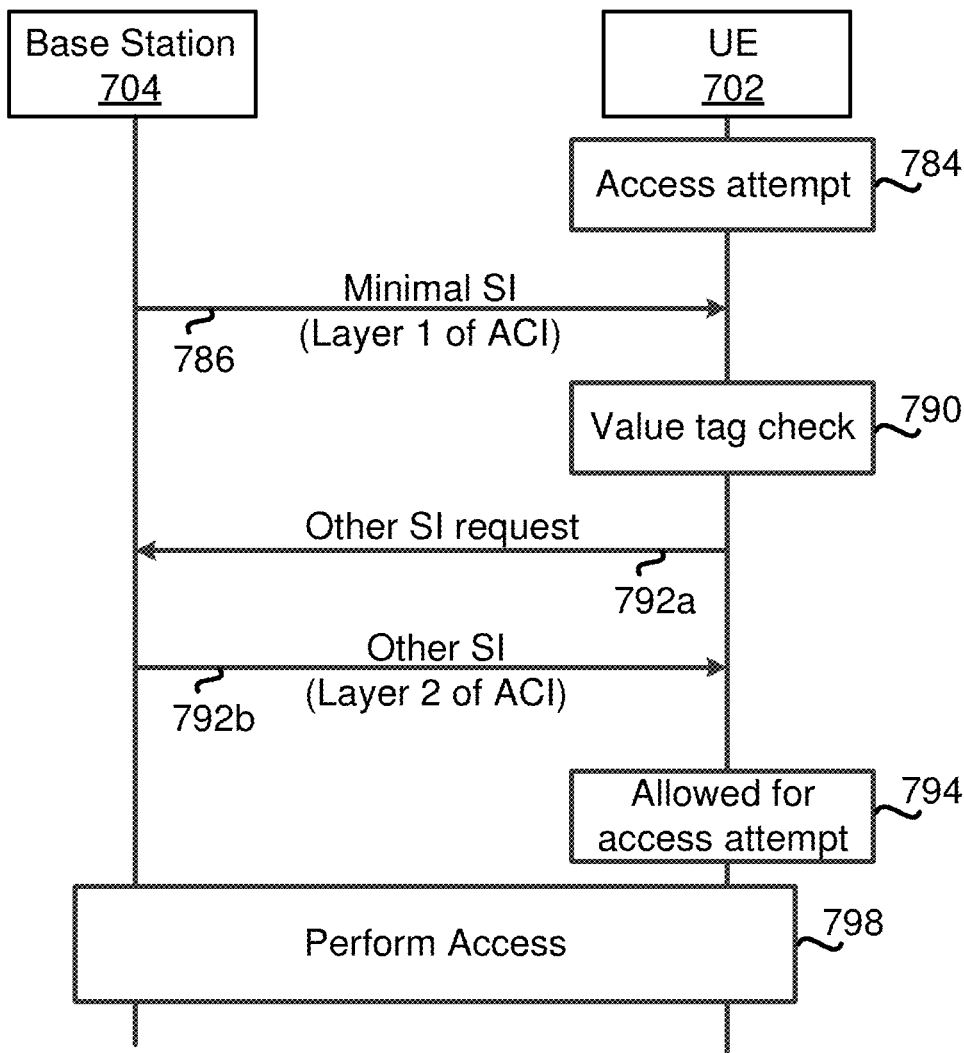
FIG. 7B is a diagram illustrating an access control information (ACI) transmission for an RRC_CONNECTED UE, according to an exemplary implementation of the present application.

FIG. 7A is a diagram illustrating an access attempt configuration (AAC) transmission for an RRC_CONNECTED UE, according to an exemplary implementation of the present application. FIG. 7B is a diagram illustrating an access control information (ACI) transmission for an RRC_CONNECTED UE, according to an exemplary implementation of the present application.

As shown in FIG. 7A, UE 702 is in RRC_CONNECTED state in action 781. During an RRC Reconfiguration procedure, base station 704 transmits an RRCReconfiguration message to UE 702 in action 782. In the present implementation, the RRCReconfiguration message contains a UE specific AAC, where the UE specific AAC is configured by base station 704 (e.g., gNB) and contains UE 702's access class(es) (e.g., sub-categorization). In one implementation of the present application, the AAC configurations are determined by the application UE 702 performs and its associated QoS requirement. In addition, a current value tag and/or its corresponding specific parameters in Layer 2 of an ACI structure (e.g., Layer 2 of ACI structure 400 in FIG. 4) for the RRC_CONNECTED UE 702 can also be contained in the RRCReconfiguration message for each access attempt purpose/category.

As shown in FIG. 7B, in action 784, UE 702 in RRC_CONNECTED state generates an access attempt. In action 786, base station 704 may provide Layer 1 of an ACI structure (Layer 1 of ACI structure 400 in FIG. 4) to RRC_CONNECTED UE 702. RRC_CONNECTED UE 702 may check whether the access control indicators for its corresponding sub-categorizations are ON or OFF by reading the access control ON/OFF indicators within Layer 1 of the ACI structure transmitted from base station 704 786. In the present implementation, UE 702 may obtain Layer 1 of the ACI structure by the minimal SI or periodically broadcasted SI from base station 704. If the access control ON/OFF indicator for a corresponding sub-categorization is OFF, UE 702 may stop reading or ignore the associated control parameters within Layer 2 of the ACI structure. If the access control ON/OFF indicator for the corresponding sub-categorization is OFF, UE 702 may also stop reading or ignore the common parameters in Layer 1 of the ACI structure. UE 702 may proceed to action 798 to perform access procedure. On the other hand, if the access control ON/OFF indicator for a corresponding sub-categorization is ON, UE 702 needs to further read the associated control parameters within Layer 2 of the ACI structure (which obtained via other SI or dedicated signaling or on-demand broadcast SI or on-demand other SI) to obtain all access control parameters it needs to apply.

Before UE 702 making a request to base station 704 for Layer 2 of the ACI structure, UE 702 may check the value tag of corresponding sub-categorization in Layer 2 in action 790. If the value tag has not been updated (e.g., the value tag of the corresponding sub-categorization is the same as the value tag contained in the AAC obtained in action 782), UE 702 may use the UE specific AAC obtained in action 782 which contains UE 702's access class(es) (e.g., sub-categorization). That is, UE 702 may use the specific parameters contained in the UE specific AAC received in action 782, instead of reading the specific parameters of the corresponding sub-categorization in Layer 2 again. Performing the value tag check in action 790 may avoid unnecessary ACI reading overhead. If the value tag has been updated, then UE 702 may need to request and read updated specific parameters in Layer 2 of the ACI structure (which may be obtained through other SI or dedicated signaling or on-demand broadcast SI or on-demand other SI), as shown in action 792a (e.g., UE 702 requesting Layer 2 of the ACI structure through other SI request) and action 792b (e.g., base station 704 providing Layer 2 of the ACI structure through other SI upon the request from UE 702, and UE 702 reading Layer 2 of the ACI).

In action 794, if UE 702 passes all the specific parameters based on the corresponding sub-categorizations, UE 702 may be allowed to access the NR network through base station 704 by following the specific parameters in Layer 2 of ACI structure. Otherwise, UE 702 may be assigned with a backoff time before reading read Layer 1 of the ACI structure again. In action 798, once UE 702 is allowed to access the NR network, UE 702 may perform access procedure with base station 704. During the access procedure (e.g., data transmission via random access, RAN notification area (RNA) update) performed by UE 702, base station 704 may also perform the UE's AAC configuration update. Within the access stage, base station 704 can provide a new/updated UE specific AAC for performing RAN notification area update, and also can provide a UE-specific AAC for performing data transmission via random access to UE 702.

Figure 8:
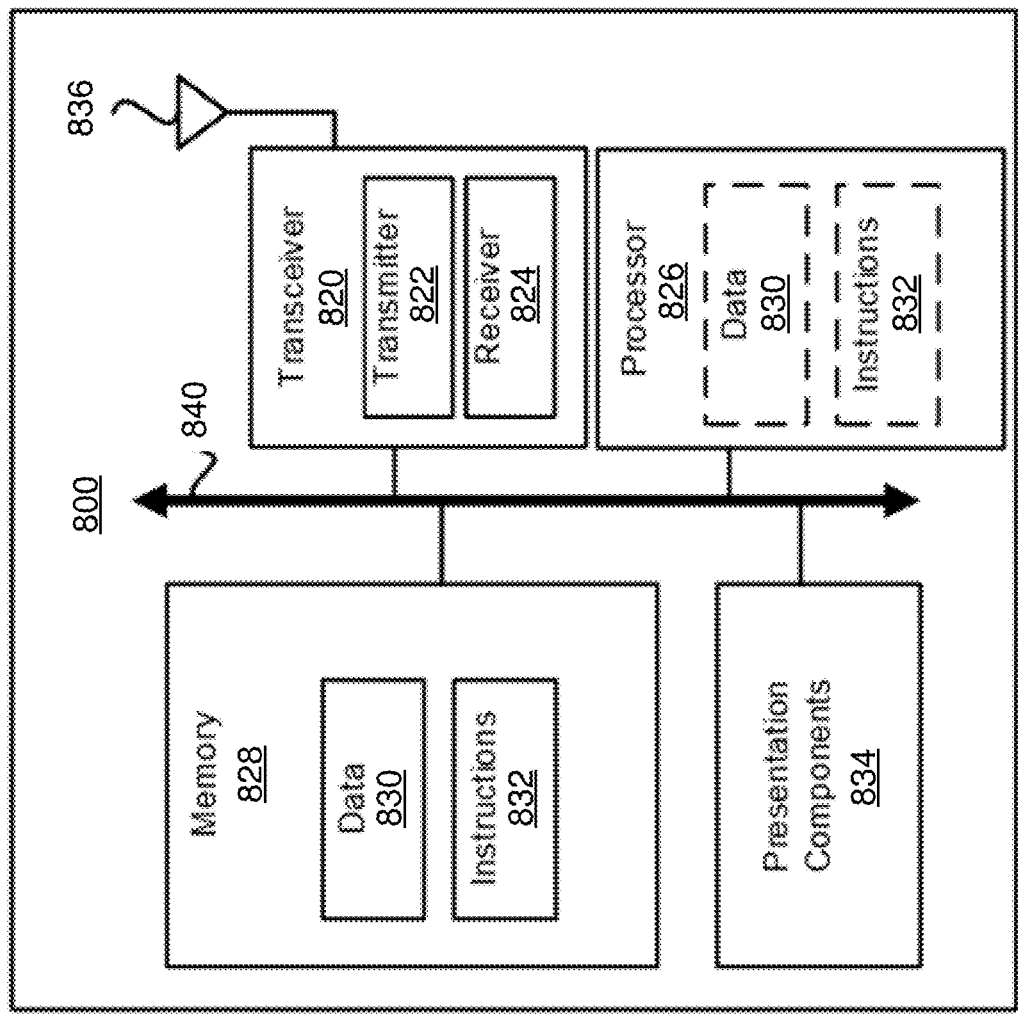
FIG. 8 illustrates a block diagram of a node for wireless communication, according to various aspects of the present application.

FIG. 8 illustrates a block diagram of a node for wireless communication, in accordance with various aspects of the present application. In one implementation, node 800 may be a wireless device, such as UEs 102a/102b, 202, 302, 602, and 702 described with respect to FIGS. 1A/1B, 2, 3, 6A/6B, and 7A/7B, respectively. In another implementation, node 800 may be a network node, such as base stations 104a/104b, 204, 304, 604, and 704 described with respect to FIGS. 1A/1B, 2, 3, 6A/6B, and 7A/7B, respectively.

As shown in FIG. 8, node 800 may include transceiver 820, processor 826, memory 828, one or more presentation components 834, and at least one antenna 836. Node 800 may also include an RF spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 840.

Transceiver 820 having transmitter 822 and receiver 824 may be configured to transmit and/or receive time and/or frequency resource partitioning information. In some implementations, transceiver 820 may be configured to transmit in different types of subframes and slots including, but not limited to, usable, non-usable and flexibly usable subframes and slot formats. Transceiver 820 may be configured to receive data and control channels.

Node 800 may include a variety of computer-readable media. Computer-readable media can be any available media that can be accessed by node 800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 828 may include computer-storage media in the form of volatile and/or non-volatile memory. Memory 828 may be removable, non-removable, or a combination thereof. Exemplary memory includes solid-state memory, hard drives, optical-disc drives, and etc. As illustrated in FIG. 8, memory 828 may store computer-readable, computer-executable instructions 832 (e.g., software codes) that are configured to, when executed, cause processor 826 to perform various functions described herein, for example, with reference to FIGS. 1 through 7B. Alternatively, instructions 832 may not be directly executable by processor 826 but be configured to cause node 800 (e.g., when compiled and executed) to perform various functions described herein.

Processor 826 may include an intelligent hardware device, e.g., a central processing unit (CPU), a microcontroller, an ASIC, and etc. Processor 826 may include memory. Processor 826 may process data 830 and instructions 832 received from memory 828, and information through transceiver 820, the base band communications module, and/or the network communications module. Processor 826 may also process information to be sent to transceiver 820 for transmission through antenna 836, to the network communications module for transmission to a core network.

One or more presentation components 834 presents data indications to a person or other device. Exemplary one or more presentation components 834 include a display device, speaker, printing component, vibrating component, and etc.

In accordance with implementations of the present application, an access attempt configuration (AAC) can either configured by a base station or a UE based on a message broadcasted by the base station. The AAC may contain information of the UE's access class, and/or ACI structure and ACI's default and/or current settings. The UE access class assignment can be based on UE ID, QoS requirement, data size, and etc. For example, conventional access control methods can provide traffic control based on the specific access class or application of the UEs, which are predefined in the UEs and fixed (e.g., stored in the UEs) after the manufacturing process. A base station can deny or allow specific access class or application by reading it directly from the UEs. Although this is a simple and straightforward process, this type of access control offers no flexibility, and can result in inefficient use of radio resource in the network. By contrast, implementations of the present application provide access control based on different parameters that can be dynamically assigned and selected.

For example, which categorization and sub-categorization(s) the UE belongs, is determined after the UE enters the cell coverage area of the base station. The base station determines the configuration and the parameters based on factors, such as current traffic condition. As such, the base station can dynamically assign the sub-categorization(s) for the UE. This allows the base station to have a very small granularity. The access control method can dynamically assign radio resource based on traffic and resource conditions, which allows the network to preserve radio resource for high priority traffic/data/application. Moreover, the ACI structures according implementations of the present application are hierarchical structures. The fundamental parameters are listed in Layer 1. Layer 2 may include delta information. The base station controls the ON/OFF of these parameters. For example, the base station's loading is light, all the parameters are off. All UEs are allowed access. However, if the loading is heavy, the base station may configure the layered ACI structure to determine which UEs can get access first based on a hierarchy. The ACI structure can allow the base station to determine which class the UE belongs, and to decide, at any given point, which types of UEs can get access or endure the access control scheme.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A method for a wireless device to trigger a Radio Access Network (RAN) Notification Area (RNA) update while the wireless device is in a Radio Resource Control (RRC) inactive (RRC_INACTIVE) state, the method comprising:
   initiating an RRC resumption procedure for the RNA update;
   acquiring an access control parameter configuration of an access category associated with the RNA update in system information block 1 (SIB1) broadcast by a network node;
   initiating a random access procedure for the RRC resumption procedure according to an indicator of the access control parameter configuration of the access category;
   wherein, when the indicator is OFF, the indicator indicates to the wireless device that the wireless device does not need to apply the access control parameter configuration of the access category, and that the wireless device is allowed to initiate the random access procedure.

2. A wireless device configured to trigger a Radio Access Network (RAN) Notification Area (RNA) update while the wireless device is in a Radio Resource Control (RRC) inactive (RRC_INACTIVE) state, the wireless device comprising:
   one or more processors;
   a non-transitory machine-readable memory storing a program, the program executable by at least one of the one or more processors, the program comprising sets of instructions for:
   initiating an RRC resumption procedure for the RNA update;
   acquiring an access control parameter configuration of an access category associated with the RNA update in system information block 1 (SIB1) broadcast by a network node;
   initiating a random access procedure for the RRC resumption procedure according to an indicator of the access control parameter configuration of the access category;
   wherein, when the indicator is OFF, the indicator indicates to the wireless device that the wireless device does not need to apply the access control parameter configuration of the access category, and that the wireless device is allowed to initiate the random access procedure.

* * * * *